United States Patent
Williams

(10) Patent No.: US 7,364,004 B2
(45) Date of Patent: Apr. 29, 2008

(54) APPARATUS FOR USE IN TURNING STEERABLE VEHICLE WHEELS

(75) Inventor: Daniel E. Williams, Lebanon, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 416 days.

(21) Appl. No.: 11/208,958

(22) Filed: Aug. 22, 2005

(65) Prior Publication Data

US 2007/0039774 A1    Feb. 22, 2007

(51) Int. Cl.
*B62D 5/06* (2006.01)
(52) U.S. Cl. ............... 180/423; 180/421; 180/422; 180/441; 91/433
(58) Field of Classification Search ............ 180/421, 180/422, 423, 441; 91/433
See application file for complete search history.

(56) References Cited

U.S. PATENT DOCUMENTS

| | | | |
|---|---|---|---|
| 4,691,797 A | 9/1987 | Miller | |
| 4,872,393 A | 10/1989 | Rabe et al. | |
| 4,942,803 A | 7/1990 | Rabe et al. | |
| 4,947,951 A | 8/1990 | Miller | |
| 5,184,693 A | 2/1993 | Miller | |
| 5,732,789 A * | 3/1998 | Stephenson | 180/418 |
| 7,055,644 B2 * | 6/2006 | Merz | 180/428 |
| 7,128,182 B2 * | 10/2006 | Otaki et al. | 180/441 |
| 7,225,894 B2 * | 6/2007 | Broughton | 180/432 |
| 2007/0095598 A1 * | 5/2007 | Williams | 180/441 |

* cited by examiner

*Primary Examiner*—Lesley D. Morris
*Assistant Examiner*—Marlon Arce-Diaz
(74) *Attorney, Agent, or Firm*—Tarolli, Sundheim, Covell & Tummino LLP

(57) ABSTRACT

An apparatus (10) for use in turning steerable vehicle wheels (14, 16) includes a hydraulic power steering motor (12). A pump (26) is operable to supply hydraulic fluid to the power steering motor (12). A gearset (50) is connected with the engine of the vehicle and the pump (26). The gearset (50) is operable to drive the pump at a first speed during turning of the steerable vehicle wheels (14, 16) at relatively low vehicle speeds. The gearset (50) is operable drive the pump at a second speed during turning of the steerable vehicle wheels at relatively high vehicle speeds. The second speed which is less than the first speed. The gearset is a differential gear mechanism.

9 Claims, 1 Drawing Sheet

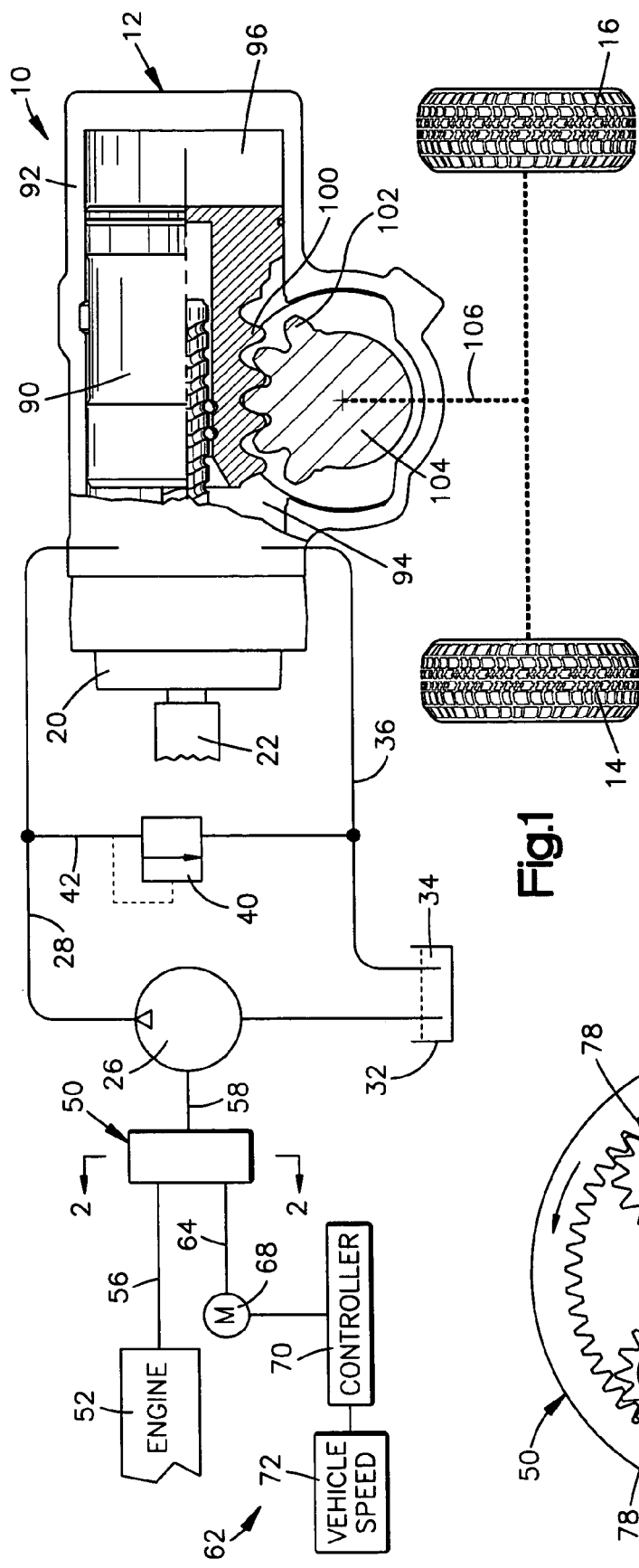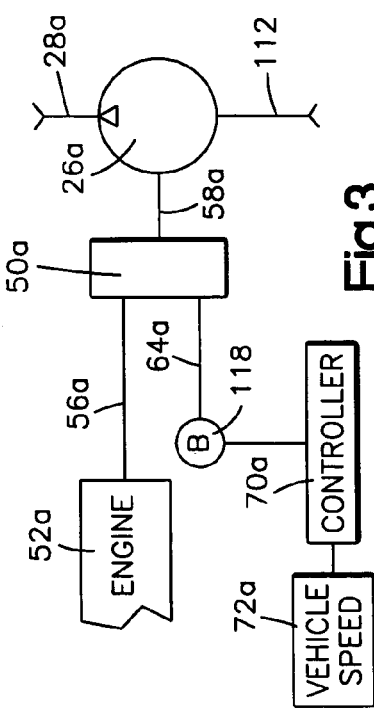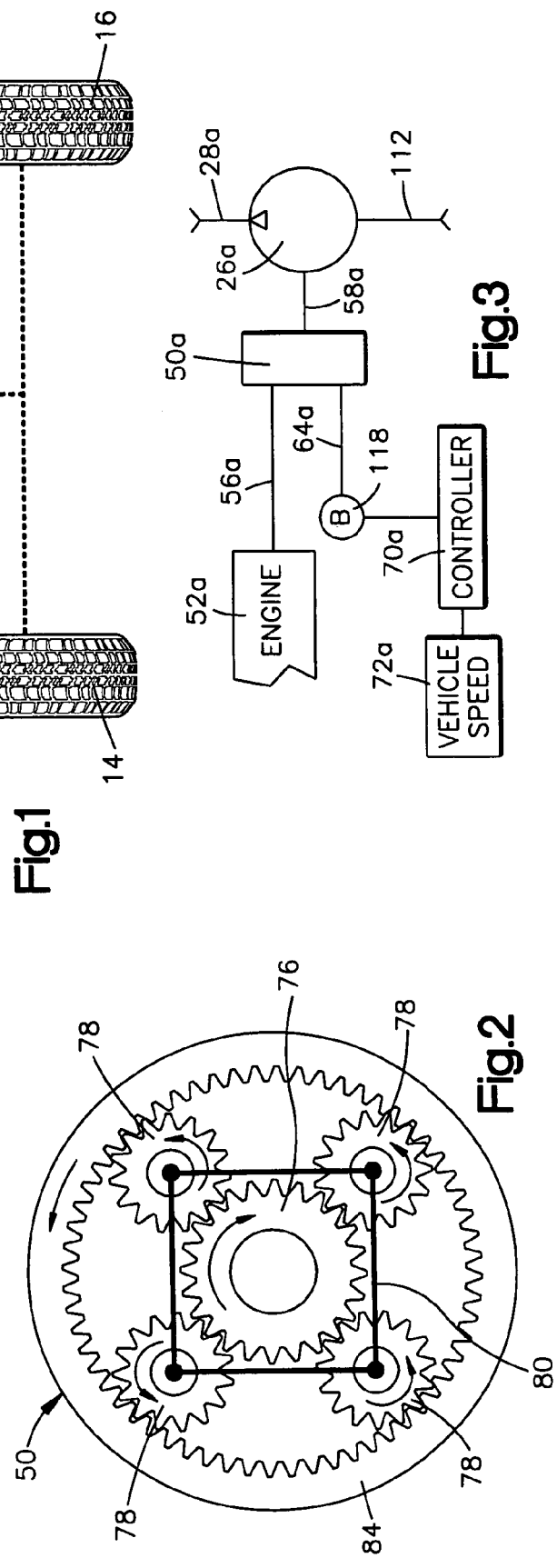

APPARATUS FOR USE IN TURNING STEERABLE VEHICLE WHEELS

BACKGROUND OF THE INVENTION

The present invention relates to an apparatus for use in turning steerable vehicle wheels during operation of a vehicle.

A known apparatus for use in turning steerable vehicle wheels includes a power steering pump. The power steering pump is typically sized to provide maximum rated flow required to dry park a vehicle at engine idle. At highway speeds the engine can operate at two or three times its idle speed. Therefore, the fixed displacement power steering pump may provide excess flow.

Excess flow from the power steering pump is diverted away from a hydraulic steering gear by a flow control valve. Therefore, only the rated flow is received by the hydraulic steering gear. Power consumed by this known system is determined by total flow delivered by the pump as a function of engine speed and the pressure drop of the steering system. One known power steering system having this general construction is disclosed in U.S. Pat. No. 5,184,693.

SUMMARY OF THE INVENTION

The present invention relates to a new and improved and apparatus for use in turning steerable vehicle wheels during operation of an engine. The apparatus includes a hydraulic power steering motor which is connected with the steerable vehicle wheels and is operable to turn the steerable vehicle wheels. A pump is connected in fluid communication with the power steering motor. A gearset is connected with the engine of the vehicle and the pump.

The gearset is operable under the influence of force transmitted from the engine of the vehicle to drive the pump at a first speed during turning of steerable vehicle wheels at relatively low vehicle speeds. The gearset is operable under the influence of force transmitted from the engine to drive the pump at a second speed during turning of the steerable vehicle wheels at relatively high vehicle speeds. The first speed at which the pump is driven by the gearset during a vehicle steering operation at relatively low vehicle speeds is greater than the second speed at which the pump is driven by the gearset during a vehicle steering operation at relatively high vehicle speeds.

A second input to the gearset may be controlled by a gearset control mechanism. The second input to the gearset may include either an electric motor or a brake.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic illustration of an apparatus constructed in accordance with the present invention and illustrating the relationship between a power steering motor, a pump and a gearset connected with an engine of a vehicle and the pump;

FIG. 2 is a schematic sectional view, taken generally along the line 2-2 of FIG. 1, illustrating the construction of the gearset; and FIG. 3 is a schematic illustration of a second embodiment of the invention.

DESCRIPTION OF SPECIFIC PREFERRED EMBODIMENTS OF THE INVENTION

A vehicle steering apparatus 10 includes a hydraulic power steering motor 12 which is connected with steerable vehicle wheels 14 and 16. A steering control valve 20 is connected with the power steering motor 12. The steering control valve 20 has an input shaft 22 which is connected with a manually rotatable vehicle steering wheel.

A pump 26 is connected in fluid communication with the steering control valve 20 and power steering motor 12 by a fluid supply conduit 28. The steering control valve 20 and power steering motor 12 are connected with a reservoir 32 containing hydraulic fluid 34 by a fluid return conduit 36. A pressure relief valve 40 is connected with the fluid supply conduit 28 by a conduit 42 and is connected with the fluid return conduit 36 by a conduit 44.

In accordance with one of the features of the invention, a gearset 50 is connected with an engine 52 of the vehicle and the pump 26. The gearset 50 is connected with the engine 52 of the vehicle by an input shaft 56 which is rotated at a speed which varies as a direct function of variations in operating speed of the engine 52. The gearset 50 is connected with the pump 26 by an output shaft 58.

A gearset control assembly 62 is connected with the gearset 50 by a second input shaft 64. Gearset 50 transmits power from the engine 52 to the pump 26. The gearset 50 is operable to drive the pump 26 at a speed which is a function of a speed at which the input shaft 56 is rotated by the engine 52 and a speed of rotation of the input shaft 64 connected to the gearset control assembly 62.

In the embodiment of the invention illustrated in FIG. 1, the gearset control assembly 62 includes a reversible variable speed electric motor 68. A controller 70 controls the direction and speed of operation of the electric motor 68 as a function of vehicle speed.

During operation of the vehicle, the gearset control assembly 62 cooperates with the gearset 50 to provide a desired rate of flow of hydraulic fluid from the pump 26 to the steering control valve 20. When the vehicle is stopped or traveling at a low speed, the gearset control assembly 62 effects operation of the gearset 50 to maximize the flow of hydraulic fluid from the pump 26 to the steering control valve 20. When the vehicle is traveling at highway speeds, the gearset control assembly 62 effects operation of the gearset 50 to provide a reduced rate of flow of hydraulic fluid from the pump 26 to the steering control valve 20. If during either low speed or high speed operation of the vehicle, the fluid pressure in the fluid supply conduit 28 exceeds a predetermined pressure, the pressure relief valve 40 is operated to direct fluid flow from the fluid supply conduit 28 directly to the fluid return conduit 36.

The gearset 50 is a differential gear assembly. The gearset 50 connects the engine driven input shaft 56 with the output shaft 58 which drives the pump 26. The differential gear assembly forming the gearset 50 also has an input connected with the input shaft 64 and motor 68.

In the embodiment of FIG. 1, the controller 70 controls operation of the motor 68 to modulate the input from the engine driven shaft 56 as a function of vehicle speed detected by the vehicle speed sensor 72. The controller 70 effects operation of the gearset 50 to have the gearset drive the pump 26 at a relatively high speed when the vehicle is stopped or traveling at a low speed. The controller 70 effects operation of the gearset 50 to have the gearset drive the pump 26 at a relatively low speed when the vehicle is traveling at a relatively high speed. This enables the pump 26 to provide a desired relatively high rate of fluid flow during low speed steering operations. During high speed steering operations, the pump 26 is effective to provide hydraulic fluid at a relatively low flow rate.

Although the gearset 50 may have any one of many different known constructions, the illustrated gearset 50 is of the planetary type. The gearset 50 includes a sun or center gear 76 (FIG. 2) which is connected to the engine driven input shaft 56. The sun gear 76 is surrounded by and in constant mesh with planet gears or pinions 78.

The planet gears 78 are mounted on and are free to rotate relative to a rotatable planet carrier 80. The planet carrier 80 is connected with the input shaft 64 which is driven by the motor 68. The planet carrier 80 is rotatable about a central axis of the sun gear 76.

The planet gears 78 and sun gear 76 are surrounded by an annular ring or internal gear 84. The ring gear 84 is disposed in constant mesh with the planet gears 78. The planet gears 78 can rotate around their own central axes and can revolve around the sun gear 76. The ring gear 84 rotates about its own central axis which is coincident with the central axis of the sun gear 76. The ring gear 84 is connected to the output shaft 58 and pump 26.

If desired, the sun gear 76 may be connected with the output shaft 58 to the pump 26 and the ring gear 84 may connected to the input shaft 56 and engine 52. Although the gearset 50 is a planetary differential gear assembly the gearset may have a different construction. For example, the gearset 50 may be a bevel gear type differential.

Operation of the motor 68 is effective to drive the input shaft 64 and rotate the planet carrier 80 about the coincident central axes of the sun gear 76 and ring gear 84. If the planet carrier 80 is rotated in the same direction as the sun gear 76, the rate of rotation of the ring gear 84 is decreased. Similarly, if the planet carrier 80 is rotated in the opposite direction from the direction of rotation of the sun gear 76, the speed of rotation of the ring gear 84 is increased.

It is contemplated that the controller 70 may effect operation of the motor 68 to rotate the planet carrier 80 in the opposite direction from the direction of rotation of the sun gear 76 when the vehicle is stopped or traveling at a low speed. This increases the speed of rotation of the ring gear 84 and the speed of operation of the pump 26 when the vehicle is stopped or traveling at a relatively low speed. When the vehicle is traveling at a relatively high speed, the controller 70 may effect the operation of the motor 68 to rotate the planet carrier in the same direction as in which the sun gear 76 is being rotated. This decreases the speed of rotation of the ring gear 84 and the speed of operation of the pump 26 when the vehicle is traveling at a relatively high speed.

Alternatively, when the vehicle is stopped or traveling at a low speed, the controller 70 may maintain the motor 68 in a deenergized condition in which it is ineffective to drive the input shaft 64. This results in the output shaft 58 being driven at a relatively high speed by force transmitted from the sun gear 76 through planetary gears 78 to the ring gear 84. When the vehicle speed increases, the controller 70 effects energization of the motor 68 to rotate the planet carrier 80 about the central axis of the sun gear 76 in the same direction as the direction of rotation of the sun gear. This results in a reduction in the speed at which the ring gear 84 and output shaft 58 to the pump 26 are driven.

As another alternative, when the vehicle is traveling at a low speed, the controller 70 may effect energization of the motor 68 to rotate the planet carrier 80 in the opposite direction from the direction of rotation of the sun gear 76. This will result in an increase in the speed of rotation of the ring gear 84 and output shaft 58 connected to the pump 26. As vehicle speed increases, the controller 70 would reduce the speed of operation of the motor 68 to thereby reduce the speed at which the planet carrier 80 is rotated in a direction opposite to the direction of rotation of the sun gear 76. This would effect a decrease in the speed of rotation of the ring gear 84 and output shaft 58 connected to the pump 26.

By utilizing the gearset 50, the normal flow control valve which is utilized to divert excess flow of hydraulic fluid from the pump 26 may be eliminated. By using the gearset 50, the pump 26 is driven at the desired speed to produce a desired flow without the use of a flow control valve. Elimination of the flow control valve reduces the energy and heat generated by the vehicle steering apparatus 10.

The power steering motor 12 includes a generally cylindrical piston 90 which divides a housing 92 into left and right variable volume chambers 94 and 96. The piston 90 has rack teeth 100 which meshingly engage teeth 102 disposed on a sector shaft 104. The sector shaft 104 is operatively connected through a vehicle steering linkage 106 to the steerable vehicle wheels 14 and 16.

Upon operation of a steering control valve 20 and response to rotation of the input shaft 22, high pressure fluid from the pump 26 flows into one of the chambers 94 and 96. In addition, fluid flows from the other chamber to the reservoir 32 through the steering control valve 20 and fluid return conduit 36.

The steering control valve 20 has a known construction. The steering control valve 20 may include a core member which is disposed inside of a sleeve member. A torsion bar may act between the core member and the sleeve member. The general construction of the steering control valve 20 and the manner in which it cooperates with the power steering motor 12 is similar to the disclosures in U.S. Pat. Nos. 5,184,693; 4,942,803; and 4,872,393.

In the embodiment of the invention illustrated in FIGS. 1 and 2, a variable speed reversible electric motor 68 is connected with the input shaft 64 to the gearset 50. In the embodiment of the invention illustrated in FIG. 3, a brake is connected with the input shaft to the gearset. Since the embodiment of the invention illustrated in FIG. 3 is generally similar to the embodiment of the invention illustrated in FIGS. 1 and 2, similar numerals will be utilized to designate similar components, the suffix letter "a" being associated with the numerals of FIG. 3 to avoid confusion.

A pump 26a is connected with a reservoir, corresponding to the reservoir 32 of FIG. 1, through a conduit 112 (FIG. 3). The pump 26a is connected with a power steering motor and control valve, corresponding to the power steering motor 12 and control valve 20 of FIG. 1, by a fluid supply conduit 28a. A gearset 50a (FIG. 3) is connected with an engine 52a of the vehicle by an input shaft 56a.

In accordance with a feature of this embodiment of the invention, a brake 118 is connected with the gearset 50a by an input shaft 64a. Operation of the brake 118 is controlled by a controller 70a which is connected with a vehicle speed sensor 72a. The gearset 50a is a differential gear assembly having the same construction as is illustrated schematically in FIG. 2. However, the gearset 50a may have a different construction if desired.

During a steering operation when the vehicle is stopped or traveling at a very low speed, the controller 70a effects operation of the brake 118 to a disengaged condition. When the brake 118 is a disengaged condition, the engine driven input shaft 56a is effective to drive an output shaft 58a connected with the pump 26a at a relatively high speed. This results in a high rate of flow of hydraulic fluid through the fluid supply conduit 28a to a power steering control valve and power steering motor to effect operation of the vehicle steering apparatus corresponding to the vehicle steering apparatus 10 of FIG. 1.

When the vehicle is traveling at a relatively high speed, the controller 70a effects operation of the brake 118 to an engaged condition. When this occurs, the gearset 50a drives the pump 26a through the output shaft 58a at a relatively low speed. This results in a relatively low rate of flow of hydraulic fluid from the pump 26a to the vehicle steering apparatus.

The brake 118 is connected with a planet carrier, corresponding to the planet carrier 80 of FIG. 2, of the gearset 50a. When the brake 118 is disengaged, the gearset 50a is effective to drive the pump 26a at a relatively high speed. Therefore, the controller 70a maintains the brake 118 at a disengaged condition during a low speed steering operation. When the brake 118 is engaged, the gearset 50a drives the pump 26a at a slower speed. Therefore, when the vehicle is traveling at a relatively high speed, and a steering operation is undertaken, the controller 70a maintains the brake 118 in an engaged condition.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels during operation of an engine of a vehicle, said apparatus comprising:

a hydraulic power steering motor connected with the steerable vehicle wheels and operable to turn the steerable vehicle wheels, a pump connected in fluid communication with said hydraulic power steering motor and operable to supply hydraulic fluid to said hydraulic power steering motor during turning of the steerable vehicle wheels, and a gearset connected with the engine of the vehicle and with said pump, said gearset being operable under the influence of force transmitted from the engine of the vehicle to drive said pump at a first speed during turning of the steerable vehicle wheels at relatively low vehicle speeds, said gearset being operable under the influence of force transmitted from the engine to drive said pump at a second speed during turning of the steerable vehicle wheels at relatively high vehicle speeds, said first speed at which said pump is driven by said gearset during a vehicle steering operation at relatively low vehicle speeds is greater than said second speed at which said pump is driven by said gearset during a vehicle steering operation at relatively high vehicle speeds.

2. An apparatus as set forth in claim 1 further including an electric motor connected with said gear set, said electric motor being operable to vary the speed at which said pump is driven by said gearset.

3. An apparatus set forth in claim 1 wherein said gear set is a differential gear mechanism having an output member connected with said pump, a first input member connected with the engine of the vehicle, and a second input member connected with an electric motor.

4. An apparatus set forth in claim 1 further including a reversible electric motor connected with said gearset, and a controller connected with said reversible electric motor, said controller being operable to effect operation of said reversible electric motor in a first direction during turning of the steerable vehicle wheels at relatively low vehicle speeds, said controller being operable to effect operation of said reversible electric motor in a second direction during turning of the steerable vehicle wheels at relatively high vehicle speeds, said second direction of operation of said electric motor being opposite to said first direction of operation of said electric motor.

5. An apparatus as set forth in claim 1 wherein said gearset is a differential gear mechanism having an output member connected with said pump, a first input member connected with the engine of the vehicle, and a second input member connected with a brake.

6. A vehicle steering system comprising:

a hydraulic power steering gear including a hydraulic motor operatively connectable with steerable vehicle wheels for, when connected with the vehicle wheels, steering the vehicle wheels, a hydraulic fluid reservoir, a fixed displacement pump having an inlet port for fluid communication with said reservoir and an outlet port for fluid communication with said steering gear, a gearset for driving said fixed displacement pump, said gear set including a first input driven by the vehicle engine and a second input controlled by a gearset control mechanism, said first and second inputs causing said fixed displacement pump to be driven at a speed to produce the hydraulic fluid flow for steering the vehicle wheels.

7. A system as defined in claim 6 wherein said control mechanism comprises a reversible variable speed electric motor.

8. A system as defined in claim 6 wherein said control mechanism comprises a brake that when actuated reduces the speed of output of said gearset.

9. A system as defined in claim 6 wherein said gearset comprises a planetary gearset for driving the pump.

* * * * *